(No Model.)

E. E. THOMAS.
ANIMAL TRAP.

No. 269,972. Patented Jan. 2, 1883.

WITNESSES.
Daniel Murphy.
Louis Feeser Jr.

Edwin Eugene Thomas,
INVENTOR, By
Louis Feeser & Co.
Atty's.

UNITED STATES PATENT OFFICE.

EDWIN E. THOMAS, OF MINNEAPOLIS, MINNESOTA, ASSIGNOR OF ONE-HALF TO WINFIELD S. HAMILTON, OF SAME PLACE.

ANIMAL-TRAP.

SPECIFICATION forming part of Letters Patent No. 269,972, dated January 2, 1883.

Application filed October 17, 1882. (No model.)

*To all whom it may concern:*

Be it known that I, EDWIN EUGENE THOMAS, a citizen of the United States, residing at Minneapolis, in the county of Hennepin, in the State of Minnesota, have invented certain new and useful Improvements in Animal-Traps, of which the following specification is a full, clear, and exact description, reference being had to the accompanying drawings, in which—

Figure 1:
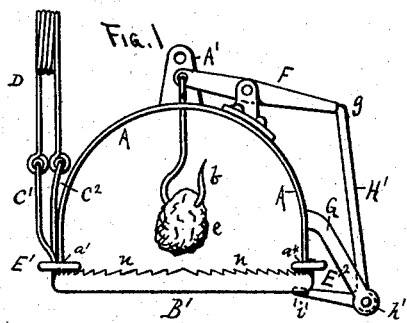
Figure 2:
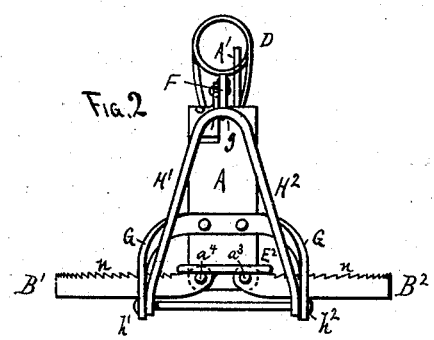
Figure 3:
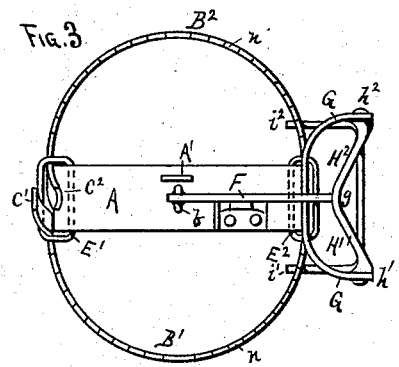
Figure 4:
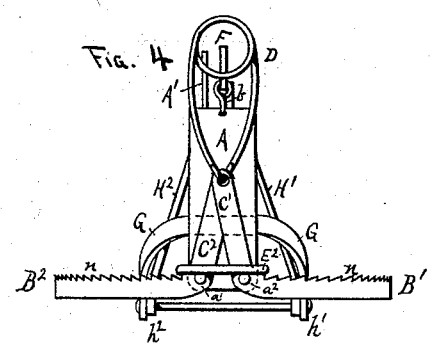
Figure 5:
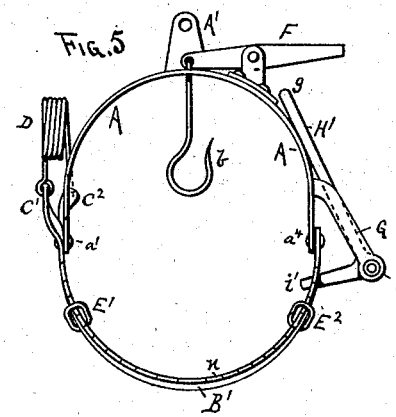
Figure 6:
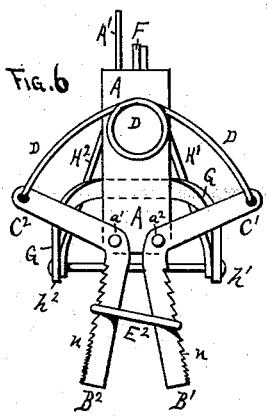

Figure 1 is a side view. Fig. 2 is an end view of the trip side. Fig. 3 is a plan view, and Fig. 4 is an end view of the spring end, showing the trap open. Fig. 5 is a side view, and Fig. 6 is an end view of the trap closed.

This invention relates to animal-traps; and it consists in the construction and the combination of parts hereinafter particularly described, and then sought to be specifically defined by the claims.

The trap is intended to be suspended from above, with the entrance to the bait from below, and consists in a semicircular metal strip or supporting-frame, A, and adapted to be suspended by a chain or other suitable means from an eye, A'.

To the lower ends of the frame A two semicircular metal bands or "jaws," B' B², are pivoted, as shown at $a'$ $a^2$ $a^3$ $a^4$. The upper ends of the jaws B' B² on one side are continued in the form of angular lever-arms C' C², connected to each other at their upper ends by a spring, D.

Encircling the lower ends of the plate A, and lying loosely upon the ends of the jaws B' B², are two small rings or hoops, E' E², their object and use to be hereinafter described. Pivoted to the upper side of the plate A is a lever, F, having a hook, $b$, hanging from the inner end, which passes down through a hole in the plate A, and is adapted to hold the bait $e$, as shown. Attached to the plate A, on the opposite side from the levers C' C², is a hanger, G, in which an angular forked trip is pivoted. This two-armed trip consists of two legs or prongs, H' H², bent over at the upper end at $g$, and passing down and pivoted at $h'$ $h^2$ in the hanger G, and then bent inward at about right angles, and with the joints $i'$ $i^2$ adapted to rest beneath the jaws B' B² when they are raised up, as shown in Figs. 1, 2, 3, and 4. The part $g$ is adapted to rest against the outer end of the lever F, as shown. By these arrangements, when the jaws B' B² are raised up, as shown in Figs. 1, 2, 3, and 4, with the points $i'$ $i^2$ of the trip H' H² beneath them, and the upper end, $g$, of the trip held outward by the outer end of the lever F, the trap will be "set," as shown in Figs. 1, 2, 3, and 4, and will be sprung only when the hook $b$ is pulled downward, as hereinafter explained.

The bait will be put upon the hook before the trap is set, and the trap will be suspended from the loop or eye A' by a chain or wire in a place frequented by the animals it is desired to catch. Then, when the animal attempts to remove the bait, the pulling down of the hook $b$ will detach the lever F from the part $g$ of the trip H' H², and cause it to fall inward against the plate A and release the ends $i'$ $i^2$ from the jaws B' B², and cause the latter to fall down over the animal's head, while at the same time the clasps or rings E' E², following down over the jaws, prevent them being again spread apart by the struggles of the animal to escape. By this means the jaws will be held together and securely hold the animal.

To prevent the possibility of the rings E' E² being forced upward on the jaws again by the struggles of the animal, backwardly-pointing teeth $n$ will be formed upon the outer edges of the jaws B' B², over which the rings will slip freely in running down, but against which they will catch and be prevented from returning, as shown in Figs. 5 and 6.

The spring D is only intended to throw the jaws B' B² downward when released by the trip, and is not intended to be heavy enough to hold the animal to any degree.

The spring may be dispensed with and the weight of the jaws alone depended upon to catch the animal; but the use of the spring renders the action a little more quick and certain.

I do not wish to confine myself to the precise form of trip mechanism shown, as I am aware that many other forms may be used.

Teeth may be formed upon the inner edges of the jaws B' B², if desired; but ordinarily the smooth edges will hold the animals sufficiently secure.

Having fully described my invention and set forth its merits, what I claim is—

1. In an animal-trap, the combination of a supporting-frame, a pair of jaws pivoted thereto, a lever pivoted on the frame, with a bait-hook suspended therefrom, and an angular trip pivoted at one side of the frame, one arm of the trip being adapted to bear against the end of the bait-hook lever, and the other arm against the jaws, so as to uphold the same, and means for holding the jaws closed, substantially as set forth.

2. In an animal-trap, the combination of a supporting-frame, a pair of jaws pivoted thereto, a lever pivoted on the frame, with a bait-hook suspended therefrom, an angular trip pivoted at one side of the frame, one arm of the trip being adapted to bear against the end of the bait-hook lever and the other arm against the jaws, so as to uphold the same, a spring connected to and serving to aid in closing the jaws, and means for holding the jaws closed, substantially as and for the purpose set forth.

3. The combination of frame A, jaws $B'$ $B^2$, pivoted thereto, lever F, pivoted to frame A, and having bait-hook $b$ suspended therefrom, hanger G, connected to frame A, the forked angular trip pivoted to hanger G, one end of the trip adapted to bear against lever F and the other end against jaws $B'$ $B^2$, and means for holding the jaws closed, substantially as and for the purpose set forth.

4. The combination of frame A, lever F, pivoted thereon, and having bait-hooks $b$ suspended therefrom, jaws $B'$ $B^2$, having lever-arms $C'$ $C^2$, and hinged to frame A, spring D, connected to lever-arms $C'$ $C^2$, hanger G, the forked and angular trip pivoted between jaws $B'$ $B^2$ and lever F, and adapted to bear against both, and clasps or rings to fit down over the jaws, substantially as and for the purpose set forth.

In testimony whereof I have hereunto set my hand in the presence of two subscribing witnesses.

EDWIN EUGENE THOMAS.

Witnesses:
C. N. WOODWARD,
LOUIS FEESER, Sr.